US 6,691,970 B1

(12) United States Patent
Sutton, Sr.

(10) Patent No.: US 6,691,970 B1
(45) Date of Patent: Feb. 17, 2004

(54) ROTATABLE SEAT SUPPORT

(75) Inventor: Warren Dale Sutton, Sr., Wathena, KS (US)

(73) Assignee: Aerospace Systems & Components, Inc., Wichita, KS (US)

( * ) Notice: Subject to any disclaimer, the term of this patent is extended or adjusted under 35 U.S.C. 154(b) by 4 days.

(21) Appl. No.: 10/201,234

(22) Filed: Jul. 22, 2002

(51) Int. Cl.[7] .................................................. B60N 2/14
(52) U.S. Cl. .................. 248/425; 248/430; 297/344.24
(58) Field of Search .................. 248/424, 425, 248/429, 430; 297/344.21, 344.22, 344.24, 344.25, 344.26

(56) References Cited

U.S. PATENT DOCUMENTS

| 3,131,964 A | | 5/1964 | Reed | |
|---|---|---|---|---|
| 3,622,202 A | | 11/1971 | Brown | |
| 3,718,365 A | | 2/1973 | Gibson | |
| 3,740,014 A | | 6/1973 | Swenson | |
| 3,789,444 A | * | 2/1974 | McCord | 114/363 |
| 3,821,825 A | * | 7/1974 | Bailey | 114/363 |
| 4,588,226 A | | 5/1986 | Young et al. | |
| 4,625,934 A | | 12/1986 | Ryan et al. | |
| 4,640,486 A | * | 2/1987 | Neville | 248/425 |
| 4,834,452 A | | 5/1989 | Goodrich | |
| 5,161,765 A | | 11/1992 | Wilson | |
| 5,251,959 A | | 10/1993 | De Braal et al. | |
| 5,558,309 A | | 9/1996 | Marechal | |
| 5,568,960 A | | 10/1996 | Oleson | |
| 5,599,065 A | * | 2/1997 | Gryp et al. | 297/344.22 |
| 5,941,498 A | | 8/1999 | Hoshihara et al. | |
| 5,971,342 A | | 10/1999 | Sakai | |
| 6,000,659 A | | 12/1999 | Brauer | |
| 6,557,919 B2 | * | 5/2003 | Suga et al. | 296/65.07 |

FOREIGN PATENT DOCUMENTS

JP 63038044 A * 2/1988 .................. 297/341

OTHER PUBLICATIONS

U.S. patent application Publication No. US 2003/0160488, Published Aug. 28, 2003, Kim et al.*

* cited by examiner

Primary Examiner—Ramon O. Ramirez
Assistant Examiner—Jon Szumny
(74) Attorney, Agent, or Firm—Kenneth H. Jack; Davis & Jack, LLC

(57) ABSTRACT

A seat support having a clevis having an annular base and upper and lower arms rotatably mounted on and extending radially outward from the annular base; at least a first support column extending downwardly from the annular base; seat mounting ball bushings having at least a first laterally extending tongue, the at least first tongue being received by the clevis; and at least a first clevis pin attaching the at least first tongue to the clevis.

17 Claims, 4 Drawing Sheets

ROTATABLE SEAT SUPPORT

CROSS REFERENCE TO RELATED APPLICATIONS

The applicant herein has contemporaneously filed a related application entitled Floating Roller Lock.

FIELD OF THE INVENTION

This invention relates to apparatus and mechanisms which are adapted for supporting a seat or chair, and which are further adapted for facilitating rotating motion of the seat or chair.

BACKGROUND OF THE INVENTION

Executive aircraft seats desirably are capable of moving rotatably about a vertical axis, and moving reciprocatingly along both lateral and longitudinal horizontal axes. Such executive aircraft seats are also preferably further capable of being selectively and alternately locked in a desired position and released for sliding or rotating motion along or about said axes to an adjusted position. Mechanical apparatus such as slides, swivels, locks, and latches facilitating the above described seat motions and functions must be housed in spaces underlying an executive aircraft seat's seat cushion. Such mechanisms are necessarily numerous and are often bulky, and are difficultly housed within such space. A desirable known aircraft seat swivel assembly comprises rotor plates which sandwich from above and below a fixed stator mounted to a seat supporting base. The additional bulk of such stratified seat swivel assemblies gives rise to a heightened need for space economy and compactness of attached structures.

The instant inventive rotatable seat support serves all of the aircraft seat functions described above while achieving a high degree of space economy and compactness by configuring vertically paired rotating mounting plates or frames to dually serve as seat rotating means and as a seat mounting clevis.

BRIEF SUMMARY OF THE INVENTION

Base support for the instant inventive rotatable seat support preferably comprises a four-legged aluminum frame having flanged feet adapted for bolted attachments to a floor of a passenger cabin of an executive aircraft. An upper surface of said frame rigidly supports a plurality, preferably six, of seat supporting posts. The seat supporting posts are preferably arranged in a regular hexagonal pattern, and have a major diagonal dimension of approximately seven inches.

The upper end of each of the preferred six posts is fixedly attached to a preferably circular stator, the stator preferably extending perpendicularly and radially outward from the six posts. Annular ball bearing races preferably respectively extend downwardly and upwardly into the upper and lower surfaces of the stator, each such race preferably nestingly receiving a multiplicity of ball bearings.

Upper and lower rotors, preferably respectively having upwardly extending and downwardly extending annular ball bearing races, nestingly receive the multiplicities of ball bearings which are similarly nestingly received by the upper and lower races of the stator. The described annular races of the stator and rotors are necessarily vertically opposed and aligned, and the preferred multiplicities of ball bearings necessarily span between said races, buffering the stator and the upper and lower rotors against frictional contact, and allowing rotating motion of the rotors with respect to the stator. Necessarily, the lower rotor comprises a post extension aperture through which the seat supporting posts vertically extend.

As an alternate to use of ball bearings, conical roller bearings which are fixedly and rotatably mounted within sloped annular races and between the stator and the upper and lower rotors, may suitably facilitate rotation. Suitably, though less desirably, high density plastic slides or lubricated metal slides may be utilized for facilitating rotating motion of the rotors about the stator.

Preferably, the upper rotor is apertured similarly with the lower rotor, the upper aperture facilitating stator access and maintenance, and reducing the weight of the upper rotor. While the upper and lower rotors are preferably configured as substantially rectangular or square plates, such rotors may be suitably alternately configured as rigid frames which include centrally located annular stator sandwiching rings.

The above described mechanical combination of a stator and upper and lower rotors beneficially forms a clevis whose base is annular, and whose arms extend radially and horizontally outward from the annular base. Distal or outer ends of the arms of such clevis are advantageously utilized for nestingly receiving seat mounting means, such means preferably comprising at least a first tongue, and preferably four tongues.

The preferred four tongues of the seat mounting means are preferably positioned at the four corners of the preferred rectangular or square upper and lower mounting plates. Each tongue preferably comprises at least a first, and preferably two, vertically extending clevis pin receiving eyes, the eyes of the tongues aligning with a second plurality of clevis pin receiving eyes extending vertically through the upper and lower plates. Common threaded bolts, smooth sided shear pins, cotter pins, screws, or rivets may suitably serve as and function as clevis pins extending through said vertically aligned clevis pin receiving eyes.

The preferred seat mounting tongues, positioned and installed as described above, advantageously dually function as spacers preventing the upper and lower rotors from respectively withdrawing upwardly and downwardly from their nesting receipts of the preferred multiplicities of ball bearings.

Where the motion an aircraft seat supported by the inventive rotatable seat support is restricted to rotation, outer ends of the tongues which are nestingly received by the clevis may directly rigidly support the seat. Preferably, for additionally facilitating horizontal seat motion, the outer ends of such tongues support seat supporting slide bar and ball bushing assemblies. Suitably and alternately, the outer ends of such tongues may support slide bar and plain bushing assemblies, slide ridge and slide channel assemblies, slide shaft and slide sleeve assemblies, roller and roller track assemblies, or ball bearing and ball bearing track assemblies, each such assembly being adapted for facilitating sliding or rolling horizontal motion of an executive aircraft seat.

Utilization of the above described clevis for nestingly receiving seat mounting means advantageously avoids mounting of seat support structures upon the upper surface of the upper rotor, promoting space economy. Additionally, the tongue and clevis seat mounting configuration provides a mechanically superior seat supporting joint.

Accordingly, objects of the present invention include achieving space economy and mechanically sound aircraft seat support by providing a rotatable seat support comprising an annular clevis having radially outwardly extending upper and lower arms, the base of the annular clevis comprising a stator which is movable rotatably with respect to inner ends of the upper and lower arms, the outer ends of the arms of the clevis nestingly receiving and retaining seat mounting means.

Other and further objects, benefits, and advantages of the present invention will become known to those skilled in the art upon review of the Detailed Description which follows, and upon review of the appended drawings.

DETAILED DESCRIPTION OF A PREFERRED EMBODIMENT

Figure 1:
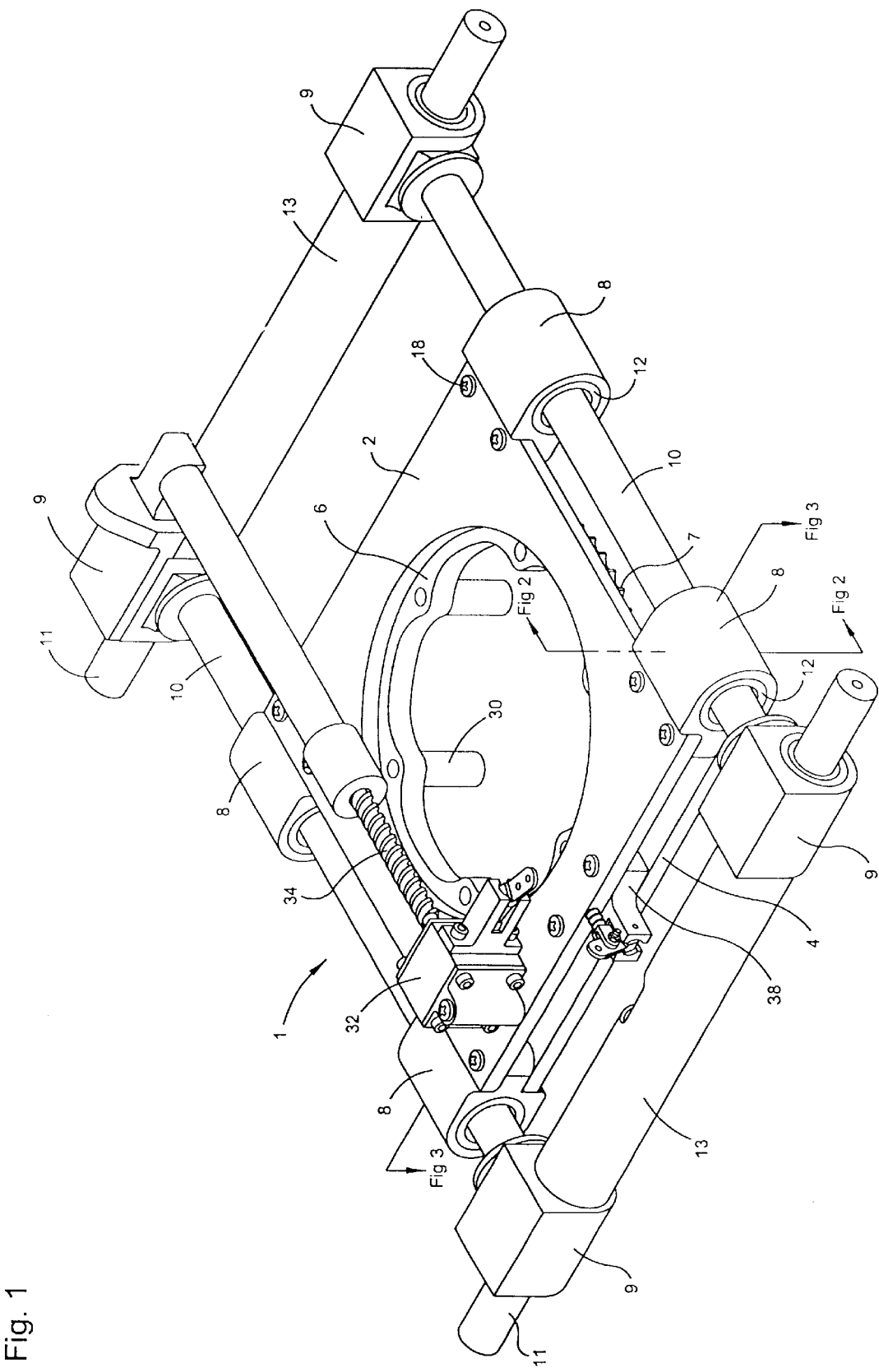
FIG. 1 is an isometric view of the instant inventive rotatable seat support.

Referring now to the drawings, and in particular to FIG. 1, the instant inventive rotatable seat support is referred to generally by Reference Arrow 1. Base support of the rotatable seat support is preferably provided by six posts 30. Referring further, and simultaneously, to FIG. 4, lower ends of posts 30 are fixedly and rigidly mounted upon an upper surface of a four legged floor mounting bracket 31.

Referring again to FIG. 1, upper ends of posts 30 are fixedly and rigidly mounted upon an annular stator 6. Referring further, and simultaneously, to FIG. 2, upper and lower surfaces of the annular stator 6 preferably include annular upwardly opening and downwardly opening ball bearing races (not depicted in view), such races nestingly receiving multiplicities of ball bearings 28. The annular outer peripheral surface of the stator 6 preferably includes a multiplicity of floating ball receiving concavities 7 for engagement with a floating ball (not depicted) of floating ball lock 38.

Referring again to FIG. 1, upper and lower rotors 2 and 4 are preferably configured as a square or rectangular plate. Referring further, and simultaneously, to FIG. 2, the upper and lower rotors 2 and 4 preferably comprise, similarly with the stator 6, downwardly opening and upwardly opening races, said races further nestingly receiving the multiplicities of ball bearings 28. The stratified sequence of lower rotor 4, ball bearings 28, stator 6, ball bearings 28, and upper rotor 2, buffers against any frictional contact between the stator 6 and upper and lower plates 2 and 4, and facilitates rotating motion of rotors 2 and 4 with respect to stator 6. The lower rotor 4 is necessarily apertured in order to allow downward extension therethrough of post 30. The upper rotor 2 is preferably, though not necessarily, apertured, the preferred upper rotor aperture advantageously providing for stator access and reducing the weight of the mechanism.

Figure 2:
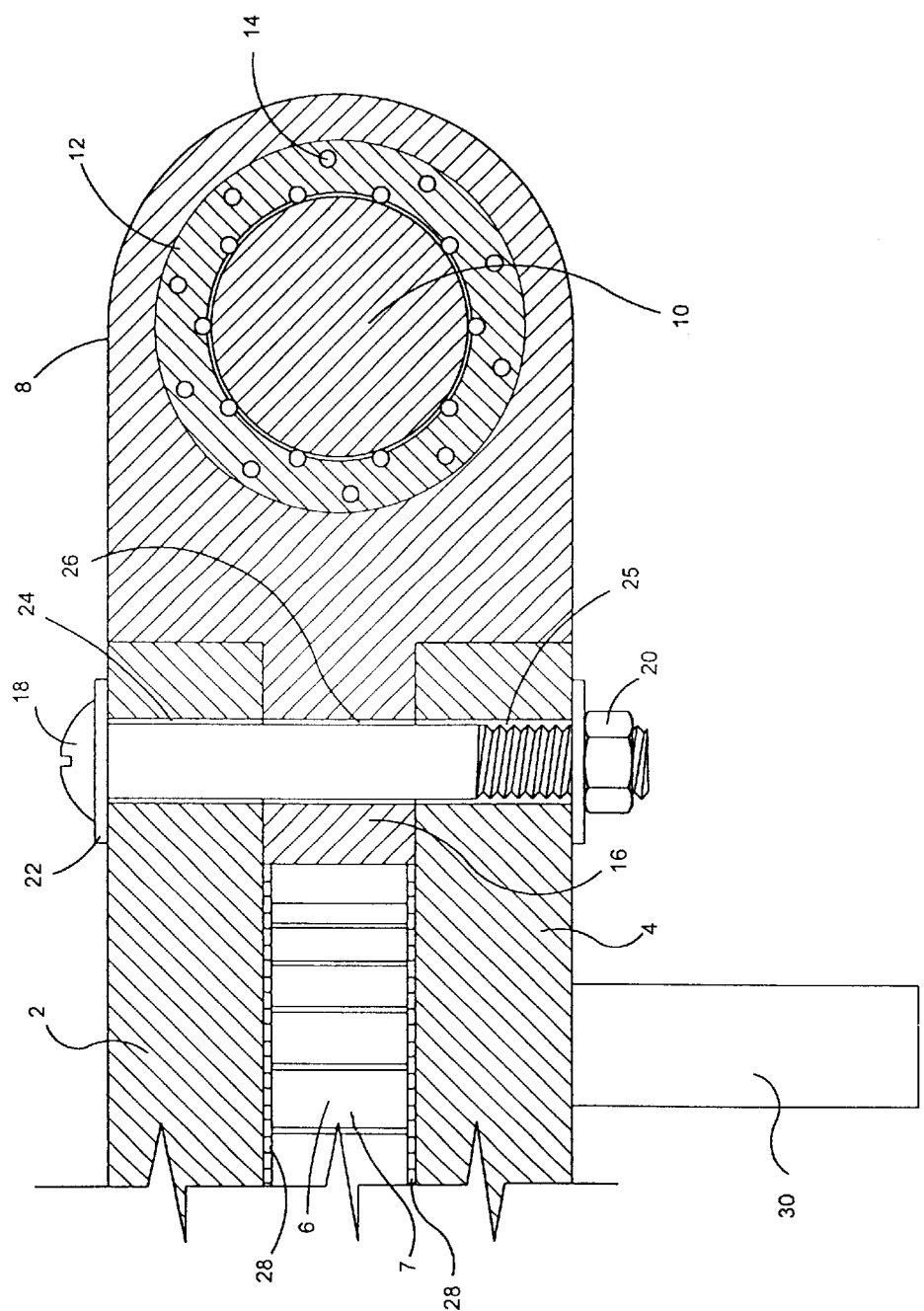
FIG. 2 is a partial sectional view as indicated in FIG. 1.
Figure 3:
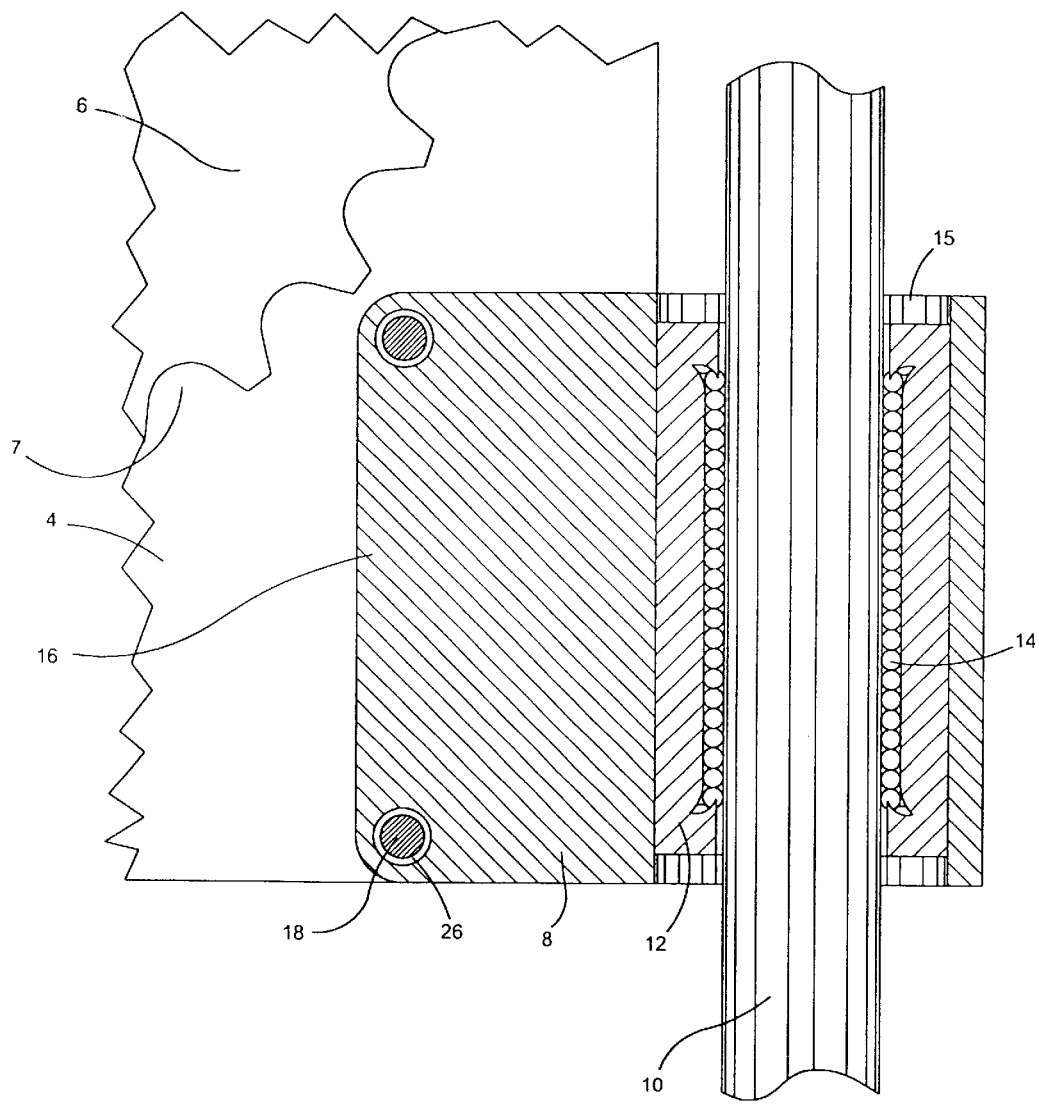
FIG. 3 is an alternate partial sectional view as indicated in FIG. 1.

Referring simultaneously to FIGS. 1–3, four tongues 16 are nestingly received between the upper and lower plates 2 and 4, each tongue including vertically extending clevis pin receiving eyes 26. Eyes 26 align with similar clevis pin receiving eyes 24 and 25 extending vertically through the upper and lower plates 2 and 4. Clevis pins, preferably configured as bolts 18, extend through the eyes 24, 25, and 26. Contact between the bolts 18 and the upper and lower plates 2 and 4 is preferably buffered by washers 22, and bolts 18 are preferably secured by spirally threaded nuts 20.

Referring further simultaneously to FIGS. 1–3, the seat mounting means comprising tongues 16 and clevis pin bolts 18, preferably support and laterally extend ball bushings 8, the ball bushings 8 including ball race sleeves 12, housed within sleeve channel 15, the race sleeves including circulating ball bearings 14 and slide bars 10.

Referring again to FIG. 1, opposing ends of slide bars 10 preferably rigidly support ball bushings 9 which are configured similarly with ball bushings 8, the ball bushings 9 slidably receiving slide bars 11. Ends of slide bars 11 are mounted upon and rigidly support an aircraft seat frame 42, said frame supporting an executive aircraft seat 40.

Figure 4:
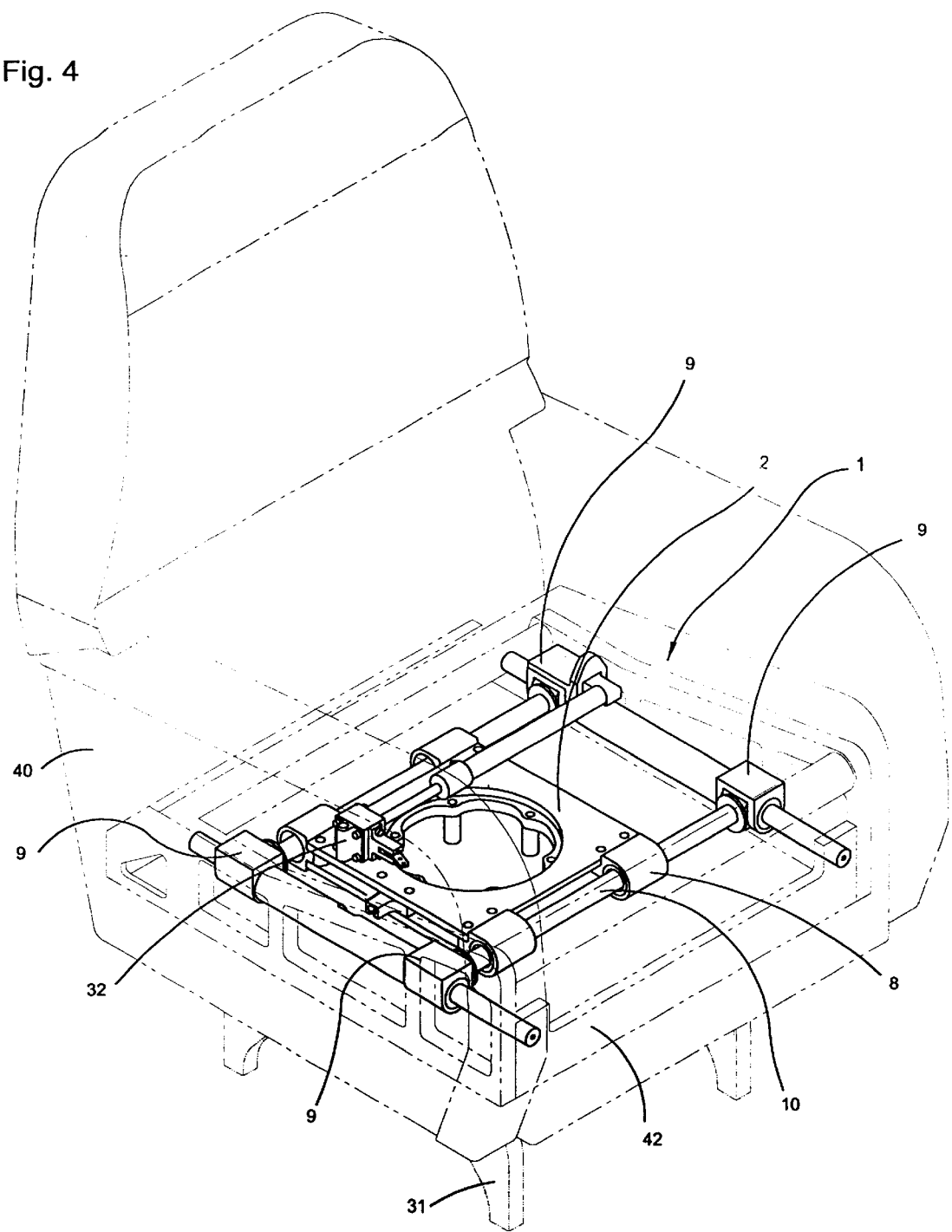
FIG. 4 depicts utilization of the inventive rotatable seat support for supporting an executive aircraft seat.

Referring simultaneously to FIGS. 1 and 4, locking mechanisms 32 and 38 (Said mechanisms preferably being configured as described in U.S. Ser. No. 10/200,981 filed on Jul. 22, 2002 to Sutton) are preferably utilized for selectively controlling rotating and lateral sliding movement of the rotatable seat support 1.

Referring simultaneously to all figures, stator 6 in combination with upper and lower plates 2 and 4 effectively forms a radially outwardly extending clevis which nestingly receives and supports seat supporting tongues 16, such tongues 16 dually functioning as seat supporting means and as plate spacers. The clevis mounts of tongues 16 beneficially avoid placement of seat mounting structures upon the upper surface of upper plate 2, making the mechanism compact and providing room for mounting of structures such as lock mechanisms 32 upon such upper surface. The clevis mount configuration also provides a mechanically superior linkage.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. A seat support comprising:
   (a) a clevis having upper and lower arms, the upper and lower arms having inner and outer ends, the clevis comprising an annular stator having an inner end, the annular stator spanning vertically between the inner ends of the upper and lower arms, the upper and lower arms being rotatably mounted upon and extending radially outward from the annular stator;
   (b) at least a first support column extending downwardly from the inner end of the annular stator;
   (c) seat mounting means comprising at least a first tongue received by the clevis; and,
   (d) at least a first clevis pin fixedly attaching the at least first tongue to the clevis.

2. The seat support of claim 1 wherein the upper and lower arms respectively comprise substantially square or rectangular upper and lower plates.

3. The seat support of claim 2 further comprising a plurality of annular races extending into the upper and lower plates and into the annular stator, and further comprising a plurality of roller or ball bearings nestingly received within the annular races.

4. The seat support of claim 3 wherein the seat mounting means further comprises a member adapted for facilitating horizontal seat movement, such member being selected from the group consisting of slide bar receiving ball bushings, slide bar receiving plain bushings, slide ridge and slide channel mounts, slide shaft and slide sleeve mounts, roller and roller track mounts, and ball bearing and ball bearing track mounts.

5. The seat support of claim 3 wherein the seat mounting means further comprises a second, a third, and a fourth tongue, each being received by the clevis, the first, second, third, and fourth tongues being positioned at corners of the substantially square or rectangular upper and lower plates.

6. The seat support of claim 5 wherein the seat mounting means further comprises first, second, third, and fourth ball bushings, the first, second, third, and fourth tongues respectively extending laterally inward therefrom.

7. The seat support of claim 6 wherein the seat mounting means further comprises first and second slide bars, each such bar extending through a pair of ball bushings among the first, second, third, and fourth ball bushings.

8. The seat support of claim 7 further comprising fifth, sixth, seventh, and eighth ball bushings, and third and fourth slide bars, the fifth, sixth, seventh, and eighth ball bushings being attached to ends of the first and second slide bars, each slide bar among the third and fourth slide bars extending through a pair of ball bushings among the fifth, sixth, seventh, and eighth ball bushings.

9. The seat support of claim 8 further comprising a rigid seat frame fixedly mounted upon the third and fourth slide bars.

10. The seat support of claim 3 wherein the substantially square or rectangular upper plate has a stator access aperture extending therethrough.

11. The seat support of claim 10 wherein the annular stator has an annular outer peripheral surface, said surface having a multiplicity of locking member receiving concavities.

12. The seat support of claim 11 further comprising a roller or ball, and further comprising means for selectively and alternately extending and retracting the roller or ball, said means being fixedly attached to the upper and lower arms of the clevis and being capable of selectively extending the roller or ball into one of the annular stator's locking member receiving concavities for locking the substantially square or rectangular upper and lower plates upon the stator.

13. The seat support of claim 12 wherein the seat mounting means further comprises a second, a third, and a fourth tongue, each being received by the clevis, the first, second, third, and fourth tongues being positioned at corners of the substantially square or rectangular upper and lower plates.

14. The seat support of claim 13 wherein the seat mounting means further comprises first, second, third, and fourth ball bushings, the first, second, third, and fourth tongues respectively extending laterally therefrom.

15. The seat support of claim 14 wherein the seat mounting means further comprises a first slide bar and a second slide bar, each such bar extending through a pair of ball bushings among the first, second, third, and fourth ball bushings.

16. The seat support of claim 15 further comprising fifth, sixth, seventh, and eighth ball bushings, and third and fourth slide bars, the fifth, sixth, seventh, and eighth ball bushings being attached to ends of the first and second slide bars, each slide bar among the third and fourth slide bars extending through a pair of ball bushings among the fifth, sixth, seventh, and eighth ball bushings.

17. The seat support of claim 16 further comprising a rigid seat frame fixedly mounted upon the third and fourth slide bars.

* * * * *